United States Patent [19]
Albizzati

[11] Patent Number: 4,855,272
[45] Date of Patent: Aug. 8, 1989

[54] PROCESS FOR PREPARING SOLID COMPONENTS FOR CATALYSTS, OR PRECURSORS OF SUCH COMPONENTS, IN THE FORM OF MICROSPHEROIDAL PARTICLES, SUITABLE FOR THE PREPARATION OF ETHYLENE POLYMERS

[75] Inventor: Enrico Albizzati, Novara, Italy

[73] Assignee: Montedison S.p.A., Milan, Italy

[21] Appl. No.: 224,179

[22] Filed: Jul. 25, 1988

Related U.S. Application Data

[63] Continuation of Ser. No. 78,087, Jul. 27, 1987, abandoned.

[30] Foreign Application Priority Data

Jul. 31, 1986 [IT] Italy ............................... 21333 A/86
Nov. 27, 1986 [IT] Italy ............................... 22469 A/86

[51] Int. Cl.$^4$ ............................................. C08F 4/64
[52] U.S. Cl. ................................... 502/119; 502/125; 502/126; 502/134; 502/152; 502/156; 526/125
[58] Field of Search ............... 502/152, 153, 119, 115, 502/126, 134, 159, 125, 156; 526/125

[56] References Cited

U.S. PATENT DOCUMENTS

| 4,657,882 | 4/1987 | Karayannis | 502/119 |
| 4,742,132 | 5/1988 | Morinaga et al. | 502/125 |
| 4,755,495 | 7/1988 | Cann et al. | 502/119 |
| 4,804,798 | 2/1989 | Albizzati | 502/126 |

*Primary Examiner*—Anthony McFarlane
*Attorney, Agent, or Firm*—Stevens, Davis, Miller & Mosher

[57] ABSTRACT

Solid components of catalysts for the (co)polymerization of ethylene, or precursors of such components are prepared by treating an (a) emulsion in a perfluoropolyether of a liquid compound of magnesium, of titanium or of another transition metal, or of solutions thereof, possibly using an electron-donor compound, with (b) a reducing and/or halogenating agent capable of forming an insoluble solid product, after which, if such a product is a precursor of the catalytic component, it is treated with a tetravalent-titanium halide, or with a halide of another transition metal.

10 Claims, No Drawings

PROCESS FOR PREPARING SOLID COMPONENTS FOR CATALYSTS, OR PRECURSORS OF SUCH COMPONENTS, IN THE FORM OF MICROSPHEROIDAL PARTICLES, SUITABLE FOR THE PREPARATION OF ETHYLENE POLYMERS

This application is a continuation of application Ser. No. 078,087, filed July 27, 1987, now abandoned.

BACKGROUND OF THE INVENTION

In the art, several processes are known for the preparation of solid catalytic components, suitable to be used in the polymerization of ethylene, and of its mixtures with alpha-olefins, comprising, as their essential components, halogenated compounds of magnesium, titanium, and an electron-donor compound. The polymers obtained by means of such catalysts are generally in powder form, with a more or less wide distribution of particle dimensions.

The use of such catalysts finds a certain limitation from the view point of the separation and of the carriage of the polymers, of the conditions of suspension polymerization, of stabilization, or of recovery of the polymer in the gas-phase polymerization processes.

The need is thus largely felt of having available catalysts endowed with a high activity, which allow polymers to be obtained in the form of particles having a narrow granulometric distribution, and furthermore endowed with a high bulk density.

Various methods have been proposed in the art for preparing such catalysts. One of them is disclosed, e.g., in European patent application No. 79102780.8, in the same Applicant's name, and consists in reacting a compound of Ti with a support consisting of, or comprising, an anhydrous Mg halide, in the form of spherical particles having an average diameter of 1–100 microns, a surface area greater than 500 m$^2$/g, and a porosity higher than 0.5 cm$^3$/g, and possibly also with an electron-donor compounds. A solid catalytic component is thus obtained which, when used with Al-or=ganometallic compounds, yields polymers in the form of particles having a narrow granulometric distribution, and endowed with high free-flowing properties. But in that case the technology is rather complex.

Another method is disclosed in European patent application No 83074 in the same Applicant's name, and consists in preparing an emulsion, in a silicone oil or in a hydrocarbon, of an immiscible liquid comprising a complex of MgCl$_2$ with AlCl$_3$ and with toluene and in reacting such an emulsion with Al-trialkyl, to precipitate a solid catalytic component. The catalysts obtained from such catalytic components yield polymers in the form of particles with a narrow granulometric distribution, but with a not yet satisfactory bulk density.

THE PRESENT INVENTION

According to the present invention, a most suited process has been found for preparing solid components of polymerization catalysts, or precursors of such components, which consists in reacting (a) an emulsion prepared by emulsifying in a perfluoropolyether a liquid compound of Mg or Ti, or another transition metal, or their solutions, in a solvent not miscible with the perfluoropolyether, with (b) a reducing and/or halogenating agent capable of precipitating such compounds in the form of a solid product containing at least one Mg-halogen bond and/or one transition metal-halogen bond, in case in the emulsion compounds of Mg and/or of a trnsition metal are present.

By the term "precursors of the solid components of the catalysts", herein those Mg compounds are meant, which contain in their molecule at least one Mg-halogen bond, and preferably one Mg-chlorine bond.

As the Mg compounds to be used in the perfluoropolyether emulsion for the process of the invention, all of those magnesium compounds are suitable, which are liquid at the emulsifying temperature, or which are dissolved in a solvent not miscible with the perfluoropolyether, and are able to give rise, by reacting with the (b) precipitating agent, to compounds containing at least one Mg-halogen bond. As the titanium compounds, or compounds of other transition metals, tetrahalides, alkoxides or halo-alkoxides of tetravalent titanium; VOCl$_3$; vanadium acetylacetonates are preferably used.

For example, to that class of compounds, those compounds belong, which have the general formula:

(I) Mg(OR$_1$)$_{2-n}$X$_n$, wherein R$_1$=optionally hydrocarbon radical of from 1 to 12 C atoms, either unsubstituted or substituted with halogen; X is a halogen, preferably chlorine; n=an integer comprised within the range of from 0 to 2, with the extremes being included. Examples of representative compounds of such formula are: MgCl$_2$, MgBr$_2$, MgI$_2$, Mg(OCH$_5$)Cl, Mg(OC$_6$H$_5$)Cl, Mg(OC$_8$H$_{17}$)Cl, Mg(OCH$_2$C$_6$H$_5$)Cl, Mg(OC$_3$H$_6$Cl)Cl, Mg(OC$_3$H$_5$Cl$_2$)Cl, Mg(O-cyclohexyl)Cl, and the mixtures of such compounds; or (II) Mg(OR$_1$)$_{m-n}$(R$_2$)$_n$, wherein R$_1$ has the above-disclosed meaning, R$_2$ can be a hydrocarbon radical containing from 1 to 12 C atoms equal to, or different from R$_1$, m and n are integers comprised within the range of from 0 to 2, with the extremes being included; or (III) MgX$_2$.nTi(OR$_1$)$_4$, wherein X=halogen, preferably chlorine, R$_1$ has the meaning as described in formula (I), n=integer greater than or equal to 2, but preferably not higher than 3.

(IV) Complexes of MgX$_2$ (wherein X has the above-said meaning) with electron-donor compounds.

As it has been mentioned hereinabove, the compounds of magnesium, titanium and other transition metals can be used, for the preparation of their emulsion in perfluoropolyether, in the form of solution in one or more solvents. Such solvents should be not miscible with the used perfluoropolyether. Preferred solvents, in case of magnesium compounds, are the Ti alkoxides or halo-alkoxides of general formula (V) Ti(OR$_1$)$_{4-n}$X$_n$, wherein R$_1$ has the meaning as described in above formula (I), and is, in particular, an alkyl, aryl, aralkyl, cycloalkyl radical, optionally containing up to 3 substitutent halogen atoms; X is a halogen, preferably chlorine, n is an integer comprised within the range of from 0 to 3, with the extremes being included.

Examples of such Ti compounds are Ti(O-iC$_3$H$_7$)$_4$, Ti(O-nC$_4$H$_9$)$_4$, Ti(O-iC$_4$H$_9$)$_4$, Ti(O-iC$_8$H$_{17}$)$_4$, Ti(O-CH$_2$C$_6$H$_5$)$_4$, Ti(O-C$_3$H$_6$Cl)$_4$, Ti(O-C$_3$H$_5$Cl$_2$)$_4$, Ti(O-C$_4$H$_9$)$_3$Cl, Ti(O-C$_4$H$_9$)$_2$Cl$_2$.

Also polymers of the compounds of general formula (V), with a polymerization degree of from 2 to 20, can be used. Mixtures of the above-said solvents with organic solvents, e.g., hydrocarbon solvents, can be used.

When the liquid Mg compound is able to react with the precipitating agent, so that it precipitates from the emulsion in the form of a solid compound containing at least one Mg-halogen bond, the presence of liquid Ti compounds in the emulsion is optional. When the Mg compound is not able to react with the precipitating agent, it is suitable to use in the emulsion a liquid Ti compound, able to bind itself to the Mg compound, and to react, in its turn, with the precipitating agent, yielding a solid product containing at least one Mg-halogen and Ti-halogen bond. In this second case, the Ti compound can act as the same solvent for the Mg compound. For example, in case as the Mg compound a dihalide is used, satisfactory results are obtained by using in the emulsion a Ti alkoxide, which forms a liquid complex with the Mg halide, capable of reacting with the precipitating agent. Such a Ti alkoxide can be one comprised in the aove disclosed general formula (V).

The perfluoropolyethers herein used for of preparing the emulsions are well-known products, wherein the perfluoropolyether structure is generally formed by recurring $C_2F_4O$— and/or $C_3F_6O$— units, optionally also comprising —$CF_2O$— units; as disclosed, e.g., in the patents to which reference shall be made.

Example of suitable perfluoropolyethers are in particular those which are in compliance with the following formulae, and have a viscosity comprised within the range of from 4 to 1500 cSt:

(A)

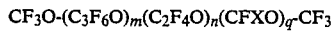

$$CF_3O-(C_3F_6O)_m(C_2F_4O)_n(CFXO)_q-CF_3$$

wherein X is equal to —F or —$CF_3$; m, n and q are integers; the m/n+q ratio is comprised within the range of from 1 to 50 and n/q is comprised within the range of from 1 to 10; the oxyperfluoroalkylene units are randomly distributed along the chain.

The preparation of these compounds is disclosed in U.S. Pat. No. 3,665,041.

(B)

$$C_3F_7O(C_3F_6O)_m-R_f$$

wherein $R_f$ is $C_2F_5$ or $C_3F_7$ and m is an integer greater than 2.

The preparation of these compounds is disclosed in U.S. Pat. No. 3,242,218.

(C)

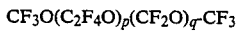

$$CF_3O(C_2F_4O)_p(CF_2O)_q-CF_3$$

wherein p and q are integers equal to, or different from each other, and the p/q ratio is comprised within the range of from 0.5 to 1.5; the oxyperfluoroalkylene units are randomly distributed along the chains. The preparation of these compounds is disclosed in U.S. Pat. Nos. 3,715,378 and 3,665,041.

(D)

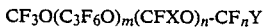

$$CF_3O(C_3F_6O)_m(CFXO)_n-CF_nY$$

wherein X and Y, equal to or different from each other, are —F or —$CF_3$; m and n are integers and the m/n ratio varies within the range of from 5 to 40. The oxyperfluoroalkylene units are randomly distributed along the chain. The preparation of these compounds is disclosed in U.K. Pat. Nos. 1,104,481 and 1,226,566.

(E) The perfluoropolyethers with oxethanic structure disclosed in Italian patent application No. 19494 A/85.

(F)

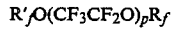

$$R'_fO(CF_3CF_2O)_pR_f$$

wherein $R_f$ and $R'_f$, equal to or different from each other, are —$CF_3$ or —$C_2F_5$ and p is an integer such that the viscosity is within the previously indicated limits. Products of this type are disclosed in U.S. Pat. No. 4,523,039.

(G)

$$R'_fO(CF_2CF_2CF_2O)_sR_f$$

wherein $R_f$ and $R'_f$, equal to or different from each other, are —$CF_3$ or —$C_2F_5$ and s is an integer such that the viscosity is within the previously indicated limits. Products of this type are disclosed in European patent application No. 148,482.

Usually, the perfluoropolyether used to the purpose of forming the emulsion has a viscosity comprised within the range of from 4 to 200 cSt.

Although the process is normally carried out with the emulsion being at room temperature, operating at a lower or higher than room temperature, e.g., at a temperature of from −30° to +90° C., is however possible.

The ratio, by volume, of the magnesium compound to the perfluoropolyether in the emulsion is comprised within the range of from 0.01 to 1.

The emulsion is preferably prepared in the presence of an emulsion stabilizer constituted by a perfluoropolyether having a functionalized terminal.

The perfluoropolyether having a functionalized terminal has preferably the following terminals:

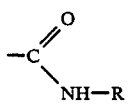

or

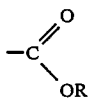

wherein R is a linear, branched or cyclic alkyl containing from 1 to 20 C atoms, or an alkylaryl containing from 7 to 20 C atoms; R may also contain heteroatoms, in particular O and/or Si atoms, and substituents, e.g., Cl.

Examples of suitable emulsion stabilizers are:

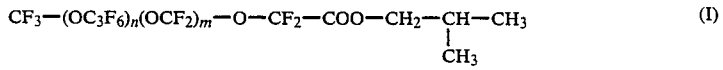

$$CF_3-(OC_3F_6)_n(OCF_2)_m-O-CF_2-COO-CH_2-\underset{\underset{CH_3}{|}}{CH}-CH_3 \quad (I)$$

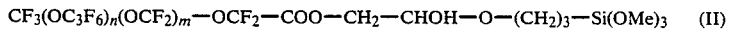

$$CF_3(OC_3F_6)_n(OCF_2)_m-OCF_2-COO-CH_2-CHOH-O-(CH_2)_3-Si(OMe)_3 \quad (II)$$

$$CF_3-(OC_3F_6)_n(OCF_2)_m-O-CF_2CO-NH-(CH_2)_3-Si(OEt)_3 \qquad (III)$$

The amount of emulsion stabilizer is generally comprised within the range of from 0.01% to 5% by weight relatively to the perfluoropolyether, however any amounts allowing the emulsion to be obtained can be advantageously used in the process of the invention.

The emulsion can be prepared, e.g., by a strong stirring, e.g., by using an Ultraturrax stirrer.

Electron-donor compounds can be added to the emulsion of Mg compound, before the treatment thereof with the (b) precipitating agent.

Particularly suitable electron-donors contain in their molecule oxygen atoms, or sulphur, phosphorus or nitrogen or silicon atoms.

In particular, the following are mentioned; esters of oxygen-containing acids, the acid halides, the ketones, the aldehydes, the alcohols, the ethers, the thioeters, the amides, the lactons, the phosphines, the phosphoroamides, the silicon compounds, such as the silanic and siloxanic compounds.

Among esters, to exemplifying purposes the following are mentioned: the alkyl esters of aromatic, aliphatic or aromatic mono- or polycarboxy acids containing from 2 to 20 C atoms in general, in particular the mono- and polyesters of the saturated and unsaturated polycarboxy acids, the esters of the aromatic hydroxyacids, and in general those disclosed, as electron-donors, in published European patent application Nos. 45976, 45977, in the same Applicant's name. Examples of such esters are methyl-, or ethyl-, butyl-, octyl-acetate, ethyl, or ethylphenyl-butyrate, ethylvalerianate, phenyl-propionate, mono- and di-ethyl-succinate, ethylmethyl, or ethyl-, propyl- or octyl-benzoate, ethyl-p-toluate, ethyl-p-anisate, diethyl-diisobutyl-malonate, diethyl-n-butyl-malonate, diethyl-n-dibutyl-malonate, diethyl-phenyl-malonate, diisobutyl-adipate, dioctylsebacate, the alkyl-maleates, the alkyl-aryl-maleates, the alkyl- or aryl-alkyl-pivalates, the alkyl-acrylates and methacrylates, the phthalates, such as the isobutyl-, diisobutyl- or dioctyl- or neopentyl-phthalate, diethyl-phthalate, diphenyl-phthalate, benzyl-butyl-phthalate; diphenylcarbonate, ethyldiphenylacetate, isobutyl-benzoylacetate, 1,2-dihydroxy-diacetato-benzene, diisobutyl-2,3-naphthalene-dicarboxylate.

Among ethers, to exemplifying purposes the following are mentioned: the mono-, di-, tri- or tetra-ethers containing from 2 to 20 C atoms, such as diethylether, dibutylether, diisoamylether, dioctylether, dioxan, trioxan, tetrahydrofuran, ethyleneglycol-dimethylether, propylene-oxide, epichlorohydrin, benzophenone.

Examples of other electron donors which can be used are phosphites, such as triphenylphosphite, triphenylphosphine, 1,4-butanediol; $POCl_3$; acetyl alpha-methyl-alpha-phenyl-chloride, benzoyl chloride, bromide and iodide, toluyl chloride, butyrolacton, and in general all of those as indicated in European patent application Nos. 86471, 86472 and 86473 in the same Applicant's name. Furthermore, the silicon compounds and the heterocylic compounds containing at least one nitrogen atom are indicated.

As the (b) precipitating agents to be used for the treatment of the emulsion, all of the halogenated compounds are suitable, which are capable of reacting with the compound of magnesium or of the transition metal contained in the emulsion to yield a solid compound containing at least one Mg-halogen bond, and/or at least one transition metal-halogen bond. In case of emulsions containing Mg compounds, the useable compounds are generally halogenating compounds capable of forming, in the reaction with Mg, Mg halides, or organometallic compounds, in particular aluminum-trialkyls, able to decompose the liquid Mg complex, with the formation of Mg halide. In case of transition metals, the precipitating agent is generally a metal reducer.

Examples of halogenating compounds are the silicon compounds having the general formula:

$$SiR_xX_{4-x}$$

wherein
R=alkyl, aryl, aralkyl or alkoxy radical containing from 1 to 20 C atoms;
X=halogen, preferably chlorine, and $0 \leq x \leq 3$;
or the titanium compounds of general formula:

$$Ti(OR)_xX_{4-x}$$

wherein R, X and x have the above expressed meaning; or the aluminum compounds, of formula:

$$AlR_xX_{3-x}$$

wherein R and X have the above expressed meaning, and $0 \leq x \leq 2$.

To exemplifying purposes, among these compounds $SiCl_4$, $TiCl_4$, $AlEt_2Cl$ are mentioned.

The treatment of the emulsion with the precipitating (or halogenating) agent is carried out by using an amount of such an agent at least equal to the stoichiometrically necessary amount to obtain at least one Mg-halogen bond in the magnesium compound present in the emulsion, and/or to obtain at least the reduction by one unit of the valence of the transition metal, when a trnsition metal compound is present.

The treatment temperature is not critical; to exemlifying purposes, operating is possible at temperatures comprised within the range of from 20° C. to the boiling temperature of the precipitating agent. The treatment can be accomplished by adding the halogenating agent as such, or diluted in a hydrocarbon solvent, to the emulsion, or viceversa.

After the reaction, the solid product is separated, washed and then, if is was obtained in the form of a precursor (i.e., if it was obtained from the emulsion without Ti compounds, or without any compounds of other transition metals, by using a precipitating agent different from a transition metal compound), it is treated with a tetravalent-Ti halide, or with a halide of a transition metal different from Ti, for the obtainment of the catalytic component, if desired, operating in the presence of an electron donor is possible.

The treatment can be accomplished also in the presence of an aromatic or halogenated hydrocarbon solvent. The size of the catalytic component of the precursor is controlled by the stirring speed, by the viscosity of the polyperfluoroether liquid and of the liquid, or solution of, compound of Mg and/or of the transition metal. In particular, the size decreases with increasing stirring speed.

The following examples are supplied to the purpose of illustrating the present invention, without constituting a limitation thereof.

EXAMPLE 1

To a 1000-ml autoclave equipped with a magnetic-anchor stirrer and a dip tube connected, thrugh a valve, to a 4000-mm long steel pipe of 2.4 mm of inner diameter, 300 ml of perfluoropolyether (denominated Epilden Dl/LS by Montefluos S,p.A.), having a viscosity of 4 cSt, 40 ml of a liquid having the composition $MgCl_2.2Ti(OC_4H_9)_4$ (equivalent to 60 mM of Mg), and 6 ml of anhydrous n-heptane are charged. The mass is kept stirred at 400 rpm, for 10 minutes, whereafter an overpressure of 50 atm of $N_2$ is added. During a 60-seconds time, the emulsion contained in the autoclave is discharged, through the above described pipe, into a 1000-ml flask, containing 400 ml of $TiCl_4$, kept stirred. The whole operation is carried out at 20° C. The reaction mass is kept stirred in the flask for 10 minutes, and the suspension is then transferred into a reactor with a fritted filter, wherein it is allowed to react at 100° for 2 hours. $TiCl_4$ is filtered off, and an equal amount thereof is added, it being let react at 120° C. for 2 hours. The suspension is filtered and the filter panel is washed with portions of 300 ml of n-heptane at 90° C., until in the filtrate no chlorine ions are present any longer.

At the analysis, the obtained solid shows a titanium content of 2.5%.

The ethylene polymerization test carried out by using 12 mg of the so obtained solid as the catalytic component gave the following results:
Polymer=384 g.
Yield=32.0 kg of polymer/catalyst g.
$[\eta]$=2.10 dl/g.
Flowability index (Flow)=21 seconds.
Compacted bulk density (C.B.D.)=0.43 g/cc.

EXAMPLE 2

To the autoclave as described in Example 1, 500 ml of perfluoropolyether and 200 ml of an 0.4M solution of Mg-(n-hexyl)$_2$ in heptane are charged.

The mass is stirred and, according to the same procedure as described in Example 1, the contents of the autoclave are discharged, through the pipe, into a flask containing 400 ml of $SiCl_4$, kept stirred. The reaction is let processed for 10 minutes at 25° C. and 2 hours at 60° C. The formed solid, after filtration and washing with n-heptane, is reacted with 100 ml of $TiCl_4$ at 185° C. for 2 hours, after which it is isolated by filtration and washing with n-heptane up to the disappearance of chlorine ions from the filtrate. At the analysis, the obtained solid shows a titanium content of 1.2%.

The ethylene polymerization test carried out by using 18 mg of the so obtained solid as the catalytic component gave the following results:
Polymer=315 g.
Yield=8.2 kg of polymer/catalyst g.
$[\eta]$=2.10 dl/g.
Flowability index=19 seconds.
Compacted bulk density=0.44 g/cc.

COMPARATIVE EXAMPLE 1

Example 1 is repeated without any use of perfluoropolyether and hence the emulsifying step being omitted. At the analysis, the obtained solid shows a titanium content of 2.6%. The ethylene polymerization test carried out by using 13 mg of the so-obtained solid as the catalytic component gave the following results:
Polymer=410 g.
Yield=31.5 kg of polymer/catalyst g.
$[\eta]$=2.0 dl/g.
Flowability=26 seconds.
Compacted bulk density=0.31 g/cc.

COMPARATIVE EXAMPLE 2

Example 2 is repeated without any use of perfluoropolyether and hence the emulsifying step being omitted. At the analysis, the obtained solid shows a titanium content of 1.25%. The ethylene polymerization test carried out by using 18 mg of the so-obtained solid as the catalytic component gave the following results:
Polymer=290 g.
Yield=18.1 kg of polymer/catalyst g.
$[\eta]$=2.15 dl/g.
Flowability=28 seconds.
Compacted bulk density=0.28 g/cc.

The polymerization conditions used in the above examples were the following.

A proper amount of the catalytic component prepared according to the examples was charged, together with 1000 ml of anhydrous n-heptane, containing 5 mmol of aluminum-triisobutyl, under a nitrogen atmosphere, to a stainless-steel autoclave of 3 liters of capacity, equipped with magnetic-anchor stirrer and heated at the temperature of 85° C.

4 Atm of hydrogen amd 9 atm of ethylene were added and the total pressure was kept constant throughout the polymerization time by continuously feeding ethylene.

After three hours of reaction, the polymerization was discontinued, the polymer was filtered off and dried.

What we claim is:

1. Process for the preparation of a solid catalytic component, suitable for use in the polymerization of ethylene or of mixtures thereof with minor amounts of alpha-olefins, or of a precursor of such a catalytic component, in the form of microspheroidal particles, which comprises reacting (a) an emulsion in a perfluoropolyether oil of compounds which are liquid under emulsifying conditions selected from magnesium compounds, transition metal compounds and mixtures thereof, solutions of said compounds or of mixtures of said compounds in solvents not miscible with the perfluoropolyether, with (b) an agent able to precipitate such a compound in the form of a solid containing at least one transition metal-halogen bond or one Mg-halogen bond or at least one transition metal-halogen bond and at least one Mg-halogen bond.

2. Process according to claim 1, wherein the magnesium compound is in the form of a solution in a liquid titanium compound.

3. Process according to claim 1, wherein the Mg compound is of the general formula:

$$Mg(OR_1)_{2-n}X_n \qquad (I)$$

wherein $R_1$=hydrocarbon radical of from 1 to 12 C atoms either unsubstituted or substituted with halogen; X=halogen, n=an integer within the range of from 0 to 2.

4. Process according to claim 1, wherein Mg compound is of the general formula:

$$\text{Mg}(OR_1)_{m-n}(R_2)_n, \quad (II)$$

wherein $R_1$ = hydrocarbon radical of from 1 to 12 C atoms either unsubstituted or substituted with halogen; $R_2$ = hydrocarbon radical containing from 1 to 12 C atoms equal to, or different from $R_1$, m and n = integers within the range of from 0 to 2.

5. Process according to claim 1, wherein Mg compound is comprised of the general formula:

$$\text{MgX}_2 \cdot n\text{Ti}(OR_1)_4 \quad (III)$$

wherein X = halogen; $R_1$ = hydrocarbon radical of from 1 to 12 C atoms, either unsubstituted or substituted with halogen; n = integer greater than or equal to 2.

6. Process according to claim 1, wherein the magnesium compound is in the form of a solution in a solvent which comprises a liquid titanium compound of the general formula:

$$\text{Ti}(OR_1)_{4-n}X_n \quad (IV)$$

wherein $R_1$ = hydrocarbon radical of from 1 to 12 C atoms either unsubstituted or substituted with halogen; X = halogen; and N = integer within the range of from 0 to 3.

7. A solid catalytic component or precursors thereof, when obtained by the process according to claim 2.

8. A process as defined in claim 1, wherein said emulsifying step is carried out in the presence of an electron-donor.

9. Emulsions in a perfluoropolyether oil of compounds which are liquid under emulsifying conditions selected from magnesium compounds, transition metal compounds and mixtures thereof, or solutions of said compounds or of mixtures of said compounds in solvents not miscible with the perfluoropolyether.

10. Process according to claim 9, wherein the Mg compound is an Mg halide.

* * * * *